Figure 1:
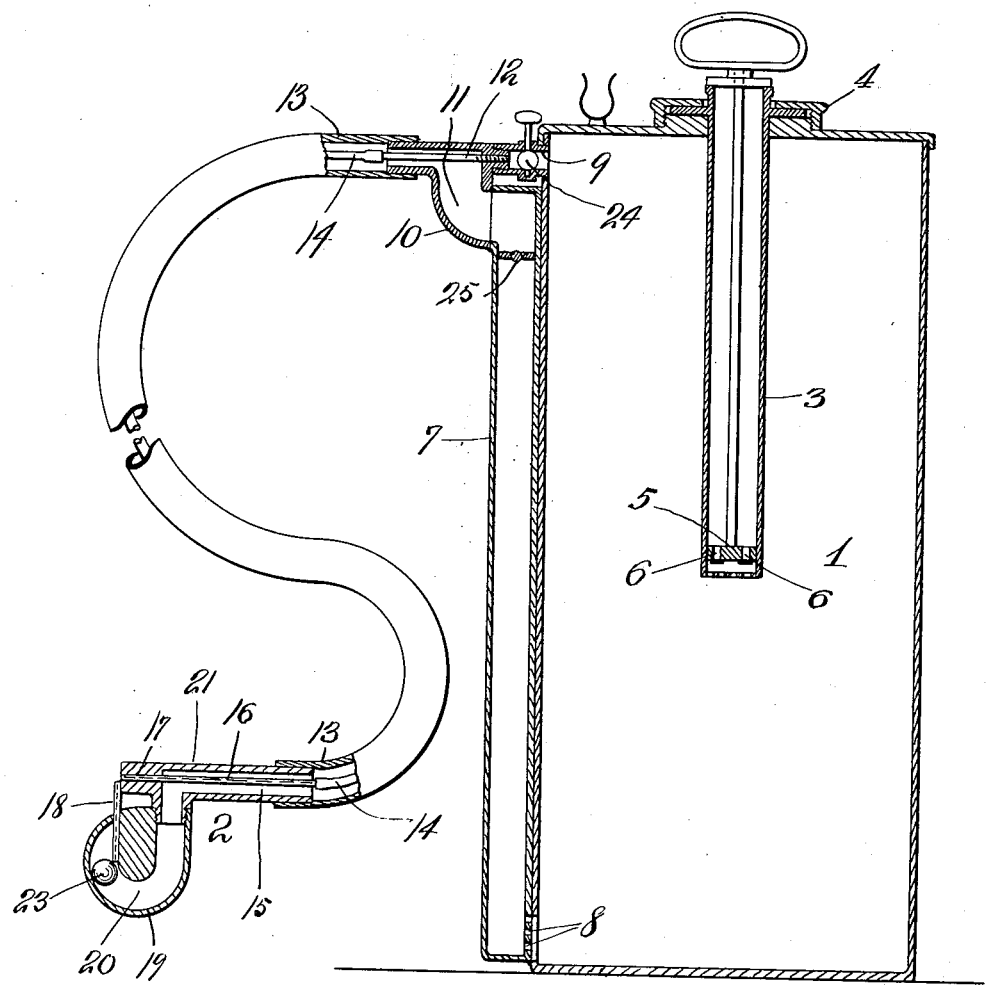

No. 869,936.  
PATENTED NOV. 5, 1907.  
D. F. PREVOST.  
SPRAYING APPARATUS.  
APPLICATION FILED FEB. 1, 1907.

2 SHEETS—SHEET 1.

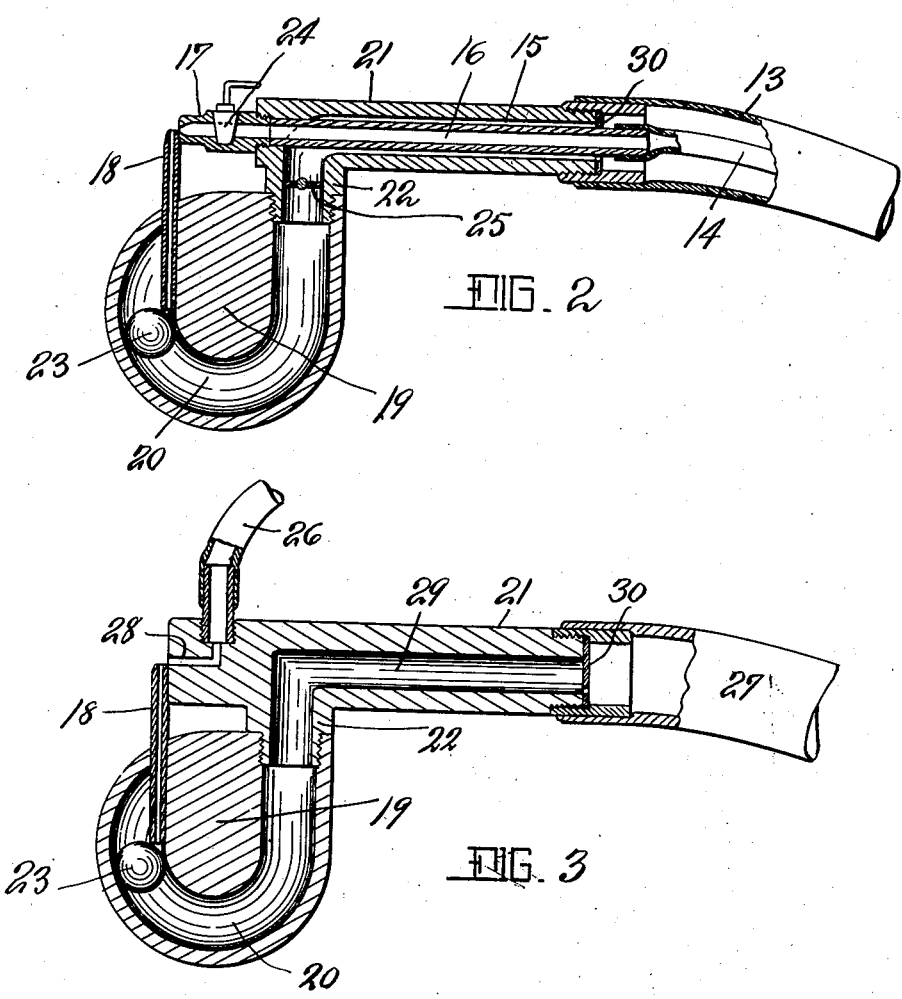

UNITED STATES PATENT OFFICE.

DWIGHT F. PREVOST, OF NEW YORK, N. Y., ASSIGNOR OF ONE-HALF TO RUTGERS IVES HURRY, OF NEW YORK, N. Y.

SPRAYING APPARATUS.

No. 869,936.  Specification of Letters Patent.  Patented Nov. 5, 1907.

Application filed February 1, 1907. Serial No. 355,201.

*To all whom it may concern:*

Be it known that I, DWIGHT F. PREVOST, a citizen of the United States, and a resident of the borough of Manhattan, city of New York, in the county of New York and State of New York, have invented certain new and useful Improvements in Spraying Apparatus, of which the following is a specification.

The present invention relates to spraying apparatus, and has for its chief object the general improvement of the structure of spraying apparatus, and has more particularly for its object means whereby a mist-like spray is produced.

The invention includes an atomizer having two nozzles, one of which is adapted to supply liquid, means for supplying air under pressure to the other of the said nozzles, and means for regulating the flow of liquid through one of the said nozzles controlled by the pressure of air exerted by the other nozzle. The means for regulating the flow of the liquid also acts to break it up before it issues from the nozzle, and preferably takes the form of a ball valve adapted to close the nozzle more or less according to the pressure exerted by the air issuing from the other nozzle. If the pressure exerted by the air is great, the ball, which is adapted to fluctuate freely, will almost close the nozzle. By this means the liquid will be forced to travel around the ball, and will be formed into a thin membrane or skin before it mingles with the air from the other nozzle. This has the effect of producing a very fine mist-like spray. When the pressure of air exerted by the other nozzle is not so great the ball will allow the liquid to flow more freely, yet tending to break up the liquid as before.

The liquid can, of course, be supplied from any suitable source of supply, but preferably there is a main source of supply which feeds either continuously or at will to a reservoir contained in the atomizer proper. To effect this feeding automatically the liquid in the main source of supply is under pressure, so that when a valve is opened in the connection leading from the main source of supply to the atomizer proper, the liquid will flow into the said reservoir. If a great quantity of liquid is required it is advantageous to maintain this valve open during the spraying operation, but, under some conditions, a sufficient amount of liquid is allowed to flow into the reservoir, after which the valve is closed. The main source of supply of liquid and the source of supply of compressed air can conveniently be contained in a tank which may be of any suitable construction. It is preferred, however, that the tank contain a body of liquid and a supply of air under pressure in free communication with each other. Suitable connections are made from this tank to the two nozzles, and by opening or closing the valves more or less in said connections, the flow of the liquid and the air can be regulated independently one of the other.

The connection for the supply of liquid in the specific form followed, consists of a duct leading from the lower end of the tank, and preferably consists of a vertically extending pipe, located exteriorly of the tank and in communication therewith at the lower end thereof. The connection for the supply of compressed air extends from the upper end of the tank, that is to say: from a point above the level of the liquid contained therein. These ducts from the tank may, of course, be connected in any suitable manner with the atomizer proper or with the nozzles thereof, but preferably I provide a coupling adjacent to the tank having two rigid ducts, one within the other, and provide in the atomizer proper two rigid ducts also one within the other, flexible connections one within the other are then interposed between the rigid ducts of the coupling and the rigid ducts of the atomizer. This results in a very simple and convenient construction.

The valves for regulating the flow of liquid may, of course, be located at any point, but preferably, and especially when a long flexible connection is used, they are located adjacent to or in the atomizer proper.

Other features of construction, combination of elements and arrangement of parts will appear as the specification proceeds.

In the drawings the invention is embodied in a concrete and preferred form, showing also modifications. It is evident, however, that this invention lends itself readily to embodiment in numerous and various forms, and that changes may be made and parts omitted without departing from the legitimate and intended scope of the invention.

In the said drawings: Figure 1 is a vertical sectional view of a spraying apparatus embodying the invention. Fig. 2 is a vertical sectional detail view of the atomizer proper. Fig. 3 is a vertical sectional detail view of a modified form of atomizer.

Similar characters of reference indicate corresponding parts in the several views.

1 indicates a tank of any suitable construction and 2 is the atomizer proper. This tank is provided with a cylinder 3 held by the removable cover 4. In this cylinder works the piston 5 provided with the valves 6. The tank can be filled with a sufficient amount of liquid, when the cover 4 and cylinder 3 are removed. After this the cover and cylinder are placed in position again and air under pressure is introduced by manipulating the piston.

Located exteriorly of the tank is a vertically extending pipe 7 communicating with the tank at its lower end by means of the perforations 8. Extending from the upper end of the tank is a pipe 9. 10 indicates a coupling having the rigid ducts 11 and 12 one within the other connecting respectively with the pipes 7 and 9. Connected to the rigid ducts 11 and 12 are the flexible tubes 13 and 14 one within the other which at their other end are in communication with the rigid ducts 15 and 16 in the atomizer proper. The atomizer carries two nozzles 17 and 18 one connecting with the supply of air and the other with the supply of liquid. The atomizer proper consists of two members one, denoted by 19, which is substantially ball shaped and has a downwardly and upwardly curved passage 20 the lower portion of which may form a liquid reservoir. The nozzle 18 connects with this passage 20. The other member 21 is composed of the two ducts 15 and 16 and is suitably secured to the ball shaped member as by the T-joint 22. This member 21 carries the nozzle 17 which communicates with the duct 15 while the T-joint 22 communicates with the passage 20. A ball 23 is contained in the passage 20 and owing to the pressure of air will tend to hug the lower end of the nozzle 18. It will be noted that the interior walls of the passage 20 are all curved, so that whether the liquid travels over the surface of the ball 23 or over the walls of the atomizer it has to traverse a curved surface which tends to break it up. Suitable valves as 24 and 25 are interposed in the air and liquid ducts. In Fig. 1 these valves are shown in the rigid pipes secured to the tank while in Fig. 2 they are shown on the atomizer proper. In addition the collar 30 may be employed located in the duct 16 to choke or retard the supply of liquid.

In Fig. 3 are shown modifications in which the flexible ducts 26 and 27 are shown as being separate and connecting with the ducts 28 and 29 formed separately in the atomizer.

When the valves 24 and 25 are opened the liquid and air will flow to their respective nozzles, and the pressure of the air will regulate the supply of liquid expelled by means of the fluctuating ball. If desired a certain amount of liquid can be allowed to enter the atomizer proper, after which the valve 25 can be closed.

1. The combination of an atomizer, two nozzles carried thereby, means for supplying liquid to one of the said nozzles, means for supplying air under pressure to the other of the said nozzles, and means for regulating the amount of liquid discharged by one nozzle controlled by the pressure of air exerted by the other nozzle.

2. The combination of an atomizer, two nozzles carried thereby, means for supplying liquid to one of the said nozzles, means for supplying air under pressure to the other of the said nozzles, and a valve for regulating the amount of liquid discharged by the one nozzle controlled by the pressure of air exerted by the other nozzle.

3. The combination of an atomizer, two nozzles carried thereby, means for supplying liquid to one of the said nozzles, means for supplying air under pressure to the other of the said nozzles, and a ball valve for regulating the amount of liquid discharged by the one nozzle controlled by the pressure of air exerted by the other nozzle.

4. The combination of an atomizer having a liquid reservoir, a nozzle extending therefrom, a second nozzle, means for supplying air under pressure to the said second nozzle, and means located in the reservoir for automatically regulating the amount of liquid discharged by one nozzle controlled by the pressure of air exerted by the other nozzle.

5. The combination of an atomizer having a liquid reservoir, a nozzle extending therefrom, a second nozzle, means for supplying air under pressure to the said second nozzle, and a valve in the nozzle extending from the reservoir and adapted to be controlled by the pressure of air exerted by the other nozzle.

6. The combination of an atomizer having a liquid reservoir, a nozzle extending therefrom, a second nozzle, means for supplying air under pressure to the said second nozzle, and a ball valve in the nozzle extending from the reservoir and controlled by the pressure of air exerted by the other nozzle.

7. The combination of an atomizer having a liquid reservoir, a nozzle extending therefrom, a second nozzle, means for supplying air under pressure to the said second nozzle, and means for breaking up the liquid before it issues from the nozzle leading from the reservoir said means being controlled by the pressure of air exerted by the other nozzle.

8. The combination of an atomizer having a liquid reservoir, a nozzle extending therefrom, a second nozzle, means for supplying air under pressure to the said second nozzle, and a fluctuating ball for breaking up the liquid before it issues from the nozzle leading from the reservoir said ball being controlled by the pressure of air exerted by the other nozzle.

9. The combination of an atomizer, two nozzles carried thereby, means for supplying liquid to one of the said nozzles, means for supplying air under pressure to the other of the said nozzles, and means for breaking up the liquid before it issues from the nozzle said means being controlled by the pressure of air exerted by the other nozzle.

10. The combination of an atomizer, two nozzles carried thereby, means for supplying liquid to one of the said nozzles, means for supplying air under pressure to the other of the said nozzles, and a fluctuating ball for breaking up the liquid before it issues from one nozzle said ball being controlled by the pressure of air exerted by the other nozzle.

11. The combination of an atomizer having a reservoir, two nozzles in said atomizer, one of which connects with the said reservoir, means for supplying liquid under pressure to the said reservoir and nozzle connected therewith, adapted to be closed at will, and means for supplying air under pressure to the other of the said nozzles, whereby liquid contained in the reservoir is drawn out through the nozzle connected therewith by the discharge of air through the other nozzle.

12. The combination of an atomizer having a reservoir two nozzles in said atomizer, one of which connects with the said reservoir, means for supplying liquid under pressure to the said reservoir and nozzle connected therewith adapted to be closed at will, and means for supplying air under pressure to the other of the said nozzles, whereby the liquid contained in the reservoir is drawn out through the nozzle connected therewith by the discharge of air through the other nozzle, and means located in the reservoir for automatically regulating the amount of liquid discharged by the one nozzle said means being controlled by the pressure of air exerted by the other nozzle.

13. The combination of a tank containing a body of liquid and a supply of air under pressure in free communication with each other, an atomizer having a reservoir, two nozzles on said atomizer, one of which connects with the reservoir, a connection from the lower end of the tank communicating with the reservoir and nozzle connected thereto adapted to be closed at will, and a connection from the upper end of the tank communicating with the other of the said nozzles whereby the liquid contained in the reservoir is drawn out through the nozzle connected thereto by the discharge of air through the other nozzle.

14. The combination of a tank containing a body of liquid and a supply of air under pressure in free communication with each other, an atomizer having a reservoir, two nozzles on said atomizer, one of which connects with the reservoir, a connection from the lower end of the tank communicating with the reservoir and the nozzle connected thereto, adapted to be closed at will, and a connection from the upper end of the tank communicating with the other of the said nozzles, whereby the liquid contained in the reservoir is drawn out through the nozzle connected thereto by the discharge of air through the other nozzle, and means located in atomizer for automatically regulating the amount of liquid discharged by the one nozzle and controlled by the pressure of air exerted by the other nozzle.

15. The combination of an atomizer composed of two members, one of which is provided with a passage having curved walls, a nozzle extending from said passage, a fluctuating ball contained in said passage the other of the said members being connected to the said passage, a nozzle carried by the said other member, and means for supplying air under pressure to the nozzle carried by the said other member.

Signed at New York city in the county of New York and State of New York this 24th day of January A. D. 1907.

DWIGHT F. PREVOST.

Witnesses:
T. F. VAN ZANDT,
AXEL V. BEEKEN.